United States Patent
Aoyama

(10) Patent No.: US 7,403,669 B2
(45) Date of Patent: Jul. 22, 2008

(54) LAND MARK, LAND MARK DETECTING APPARATUS, LAND MARK DETECTION METHOD AND COMPUTER PROGRAM OF THE SAME

(75) Inventor: Chiaki Aoyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 410 days.

(21) Appl. No.: 10/961,251

(22) Filed: Oct. 12, 2004

(65) Prior Publication Data

US 2005/0117781 A1  Jun. 2, 2005

(30) Foreign Application Priority Data

Dec. 1, 2003  (JP)  ............... 2003-401645

(51) Int. Cl.
*G06K 9/36* (2006.01)
*G06K 9/00* (2006.01)

(52) U.S. Cl. .............. 382/281; 382/153; 382/291; 382/107

(58) Field of Classification Search ........... 382/107, 382/281, 113, 291, 153, 154; 358/3.26
See application file for complete search history.

(56) References Cited

U.S. PATENT DOCUMENTS 6,615,108 B1 * 9/2003  Peless et al. ............... 700/245
6,721,444 B1 * 4/2004  Gu et al. ..................... 382/154
6,789,737 B2 * 9/2004  Tien ........................ 235/462.45

FOREIGN PATENT DOCUMENTS

JP  11-085981  3/1999

OTHER PUBLICATIONS

Ayusawa T. et al. "Detection and Data Acquisition of a Scattered Object Using Marks and a Barcode"; Proceedings of 14th annual meeting of Robotics Society of Japan, pp. 175-176 (1996).
Aoyagi S. et al. "Recognition and Handling of Tableware by Using a Robot Based on RECS Concept"; Journal of The Institute of Electrical Engineers of Japan, vol. 120-C, No. 5, pp. 615-624 (2000).

* cited by examiner

*Primary Examiner*—Bhavesh M. Mehta
*Assistant Examiner*—John B Strege
(74) *Attorney, Agent, or Firm*—Squire Sanders & Dempsey L.L.P.

(57) ABSTRACT

The present invention provides a land mark detecting apparatus simultaneously used with a land mark comprising plural mark primitives. The land mark detecting apparatus comprises a set of cameras and a land mark detector which includes an image signal interface unit, a pre-processing unit, a straight line detector to and a mark specifying unit.

6 Claims, 16 Drawing Sheets

Video image picture

Brightness adjusted image picture

Binary qualified image picture

FIG.7

Rule<1>

| (-1,-1) | (0,-1) | (1,-1) |
|---|---|---|
| (-1,0) | (0,0) | |

Rule<2>

| (-1,-1) | (0,-1) | (1,-1) |
|---|---|---|
| (-1,0) | (0,0) | |

Rule<3>

| (-1,-1) | (0,-1) | (1,-1) |
|---|---|---|
| (-1,0) | (0,0) | |

Rule<4>

| (-1,-1) | (0,-1) | (1,-1) |
|---|---|---|
| (-1,0) | (0,0) | |

Rule<5>

| (-1,-1) | (0,-1) | (1,-1) |
|---|---|---|
| (-1,0) | (0,0) | |

Labeled image picture

Edge image picture

Line picture

FIG. 13

| Kind | Length |
|---|---|
| Blank (200) | 2 |
| Region (104) | 3 |
| Blank (201) | 15 |
| Region (105) | 15 |
| Blank (202) | 10 |
| Region (106) | 9 |
| Blank (203) | 4 |
| Region (107) | 4 |
| Blank (204) | 2 |

Binary qualified image picture

Video image picture(grey scale image)

LAND MARK, LAND MARK DETECTING APPARATUS, LAND MARK DETECTION METHOD AND COMPUTER PROGRAM OF THE SAME

FIELD OF THE INVENTION

The present invention relates to a land mark which is used for the reference to detect the position of an autonomous robot by means of image processing, a land mark detecting apparatus which includes cameras and a land mark detector detecting the land mark, a land mark detection method by which the land mark is detected and computer program to carry out the land mark detection method.

The conventional technology applied to the vehicles such as autonomous robots and autonomously automotive work vehicles uses a position detection that is to detect a predetermined mark affixed to the floor or ground on which the vehicles are running or the objects which is to be manipulated so that the vehicles can specify their self-positions, in-navigation positions and position of the objects which the vehicles are facing to.

For the technology to be used for such position detections, high precision detection technology that uses a special land mark that has no analogous pattern elements in any viewing angles has been proposed (see reference 1).

Another technology to detect the scattered objects and acquire the data by using a mark which adopts a pair of two concentric circles and a barcode printed therebetween has been proposed (see reference 2). A recursive reflection sheet that reflects the incidental lights to the incidental directions is placed on tableware in a barcode patter has been proposed as a technology for the detection of an object and the data acquisition (see reference 3).

Reference 1:
Paragraphs 0022 to 0033, FIGS. 2 and 4-6, Japanese Published Patent, 11-85981, A (1999)

Reference 2:
"Detection and Data Acquisition of a Scattered Object using Marks and a Barcode", T. Ayusawa, Y. Hada, H. Shimizu and K. Takase, Proceedings of 14th annual meeting of Robotics Society of Japan, pp. 175-176 (1996).

Reference 3:
"Recognition and Handling of Tableware by Using a Robot Based on RECS Concept", S. Aoyagi, H. Kinomoto, S. Ieuji and M. Takano, Journal of The Institute of Electrical Engineers of Japan, Vol. 120-C, No. 5, pp. 615-624 (2000)

The technology disclosed in the reference 1 may determine the position and the direction of the reference line to specify the mark (land mark) by using the light intensity of the image taken by the stereo cameras. However, the area of the region occupied by the mark varies against the slant angle when the viewing of the mark is in the direction of, for example, the upper slant. This results in the degradation of detection precision.

The technology disclosed in the reference 2 may determine the position and the direction of the object to which the mark label is affixed by detecting the two concentric circle marks and a barcode printed therebetween. However in order to read the barcode on the object by the viewing image taken by a camera, the distance from the object has to be shorter than the camera resolution to detect the barcode information. Therefore, autonomous robots and autonomously automotive work vehicles which need the resolution distances to be close to the objects as in the rage of several tens of centimeters to several meters have a difficulty to determine the information on the barcode during moving.

The technology disclosed in the reference 3 has the same difficulty to determine the information of the objects because the similar barcode marks are used as described in the reference 2. This technology has further drawback such that the marks cannot be identified if the same marks are placed in a series and therefore the direction of the objects to which the marks are affixed cannot be determined.

The present invention has an advantage to solve these problems so that it is possible to determine the position and the direction of the objects under the condition that the distance from the objects to the detector varies in wide range. The present invention provides the land mark, the land mark detection apparatus to determine the position and the direction of the land mark, the detection method and computer program of such system.

BRIEF SUMMARY OF THE INVENTION

The present invention has the advantage as described above. One of the details of the advantage of the present invention is described that the position detection mark in the Claim 1, that is, the landmark comprises plural mark primitives which have rectangular shapes and are aligned in a reference line to which all of the rectangular shapes have parallel sides, wherein the first mark primitive has the longer sides parallel to the reference line than a second and a third mark primitives which are placed in both sides of the first mark primitive along the reference line, respectively. This composition of the mark primitives facilitates to detect the presence of the land mark since the center of the land mark is identified due to the longer length than the other two mark primitives though the land mark images in the video image pictures are always deformed and the three line segments of three rectangles that compose the land mark can be easily detected as being in a line alignment after the center rectangles (that is the first mark primitive) is identified.

The mark primitives of the land mark, as described in Claim 2, have the sides parallel to the alignment line and the three sides have the different lengths. Therefore it is possible to provide the information of the orientation when the land mark is affixed to an object.

The land mark according to Claim 3 is configured that the distance from the left end of the first mark primitive to the left end of the second mark primitive substantially equals to the right end of the first mark primitive to the right end of the third mark primitive. The center of the land mark is always in the first mark pattern and therefore the longest straight line segment of the land mark is easily found in the land mark.

The land mark according to Claim 4 is made from a recursive reflective material. The infra-red light lamp to illuminate the land mark from the land mark detector can easily detect the presence of the land mark even the land mark is exposed to the bright environment. The reason is that the light reflection from the recursive reflective material coincides fundamentally with the direction of the incident light with the reverse orientation.

The land mark detecting apparatus according to Claim 5 is constructed by an image signal interface unit, a pre-processing unit, a straight line detector, a mark specifying unit. In this construction of the land mark detecting apparatus, the image signal interface unit receives image signals from the set of cameras that take scenes where the land mark locates and generate a video image picture from the image signals sent by the set of the cameras. The pre-processing unit determines candidate regions for the mark primitives in the video image picture wherein the candidate regions are remarked by any one of differences of the color and brightness of the images in the video image picture. The straight line detector detects straight line segments of the candidate regions in the video image picture. The mark specifying unit specifies positions of the land primitives in the land mark by extracting from the candidate regions for the mark primitives on a basis of information of the elemental dimensions and the relative dimensional ratios which are predetermined for the land mark and information of presence ratio of the region exiting on the straight line segments.

The land mark detector according to Claim 6 has further advantage such that the pre-processing unit according to Claim 5, wherein the straight line detector includes an edge image generator which generates an edge image picture from the video image picture and a Hough transformation processor which extracts straight lines from edge images in the edge image picture by Hough transforming the edge images.

The land mark detector according to Claim 7 has further advantage such that that the mark specifying unit according to Claim 5 further includes a three-dimensional (abbreviated as "3D", hereinafter) land mark position determining unit on a basis of the candidate regions for the mark primitives and dimensional land mark data stored in a mark data storage. The 3D land mark position determining unit can compute and determine the 3D spatial position of the land mark by using the parallax obtained in two video image pictures and the calibration data of the cameras.

The 3D land mark position determining unit according to Claim 8 further uses the mark primitives which are determined by differentiated light intensities of the video image pictures for the determination of 3D land mark positions.

The land mark detecting method according to Claim 9, by which a land mark comprising plural mark primitives which have rectangular shapes and are aligned in a reference line to which all of the rectangular shapes have parallel sides is detected, comprises a step of receiving video images taken by plural cameras, a step of pre-processing for determining candidate regions for the mark primitives in the video image picture wherein the candidate regions are remarked by any one of differences of the color and brightness of the image, a mark detection unit for detecting straight lines from the edge image in the edge image picture generated by detecting edges of all of the candidate regions.

Therefore this land mark detecting method first specifies the positions of the land primitives in the landmark by extracting from the candidate regions for the mark primitives on a basis of information of the elemental mark dimensions and the relative dimension ratios which are predetermined for the land mark and information of presence ratio of the region exiting on the straight line segments.

The land mark detecting method has further step for computing a 3D land mark portion by plural video images that have the 2D positions of the land marks.

The computer program of land mark detection according to Claim 10 enables a group of at least one computer system to execute a step of controlling receipt of video images, a step of pre-processing for determining candidate regions, a step of generating an edge image picture by detecting edges of all of the candidate region, a step of a Hough transformation processing, a step of specifying positions of the land primitives in the land mark, a step of computing a 3D land mark on a basis of the candidate regions.

In this design of the computer program of the present invention enables a computer hardware system to control the receipt of video images taken by plural cameras, determine the candidate regions for the mark primitives in the video image picture wherein the candidate regions are remarked by any one of differences of the color and brightness of the image and detect the straight lines from the edge image in the edge image picture generated by detecting edges of all of the candidate regions.

Therefore the computer program of land mark detection cooperates with a computer hardware system so that the total computer system can first specifies the positions of the land primitives in the land mark by extracting from the candidate regions for the mark primitives on a basis of information of the elemental mark dimensions and the relative dimensional ratios which are predetermined for the land mark and information of presence ratio of the region exiting on the straight line segments.

The total computer system can compute a 3D land mark portion by plural video images that have the 2D positions of the land marks.

BRIEF DESCRIPTION OF THE DRAWINGS

FIG. 7 shows a set of rules for image labeling.

FIG. 13 shows a list of the lengths of the candidate regions and the lengths of blanks between the candidate regions.

DETAILED DISCRIPTION OF THE INVENTION

The details of the present embodiment of the present invention are explained by using the figures. First, the graphical element of the land mark that is called a mark primitive in this invention will be explained and then the land mark detection apparatus that includes a land mark detector will be explained.

(Land Mark)

Figure 1A:
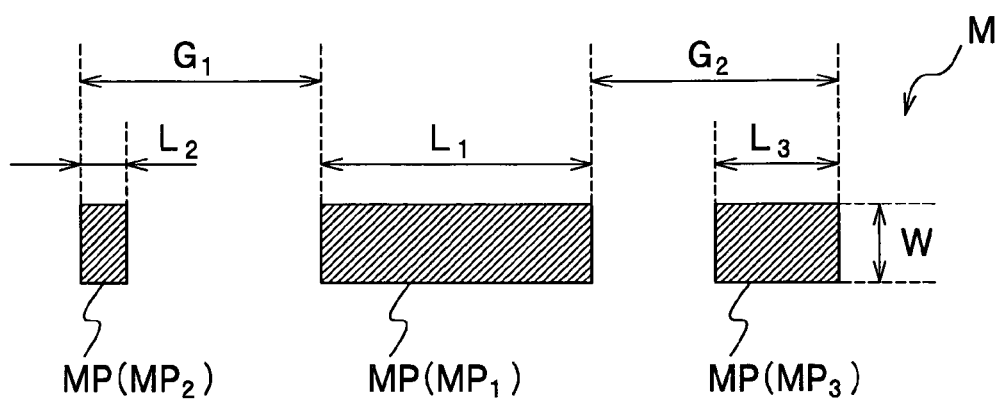
FIG. 1A is a planer drawing that shows the planer shape of the land mark primitives.
Figure 1B:
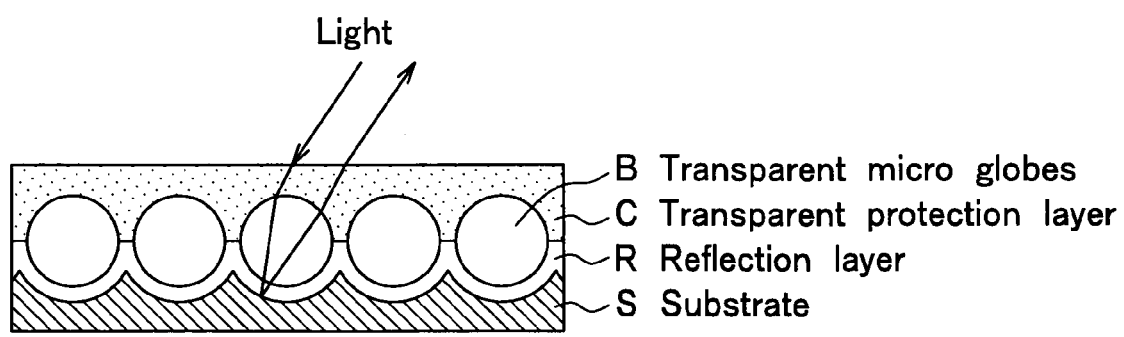
FIG. 1B is a cut view drawing of the land mark primitive which is made of a recursive reflective material.

In the FIG. 1, the land mark primitives are to be explained. FIG. 1A is a plan view that shows the planer shape of the land mark primitives. FIG. 1B is a cut view of the land mark primitive which is made of a recursive reflective material.

As shown in FIG. 1A, the land mark M composed of the mark primitives MPs (MP1, MP2 and MP3) of which lengths to an alignment direction are different each other are separately placed on the reference line directing in such alignment direction. The land mark M consists of the first mark primitive MP1 which has the longest side to the alignment direction and the second and the third marks MP2 and MP3 are place both sides of MP1. Assuming the side of MP1 is the longest the sides among all of the mark primitives and the sides of the other mark primitives have the relation as follows;

$$L2<L3<L1 \quad (1)$$

where, L1, L2 and L3 are the lengths of the sides of the mark primitives MP1, MP2 and MP3, respectively.

Figure 2A:
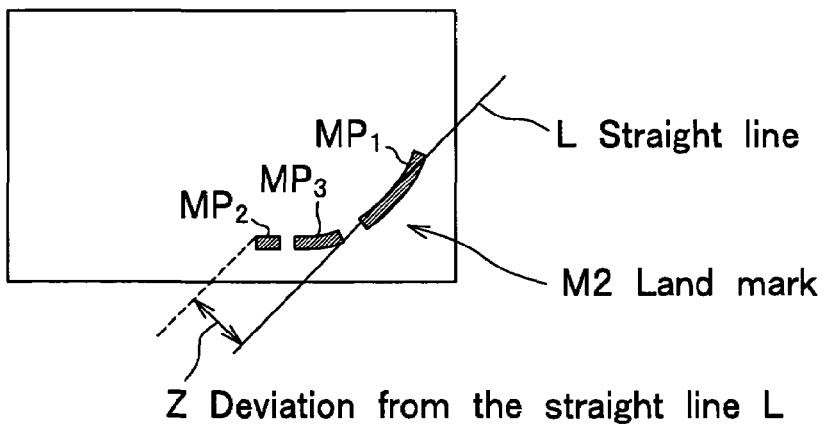
FIG. 2A is a video image picture of land mark M2 which has been modified in the alignments of the mark primitives.
Figure 2B:
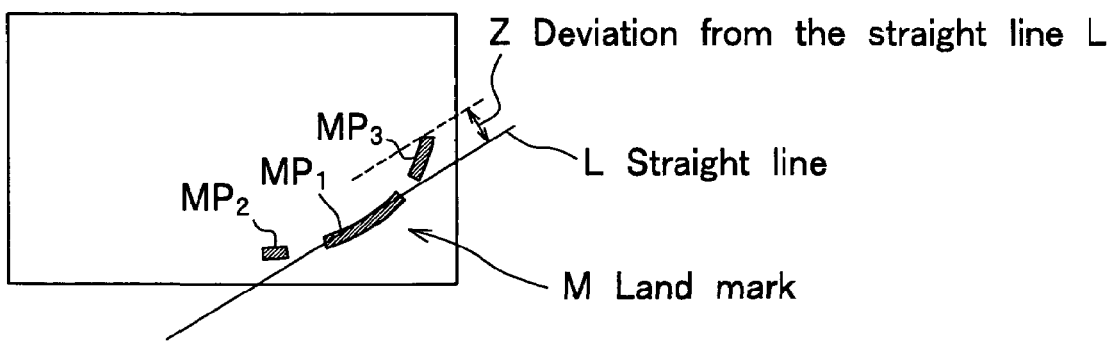
FIG. 2B is a video image picture of land mark M

According to the difference of the lengths of the sides of the mark primitives MP2 and MP3, the orientation of the direction of the land mark can be specified. By placing MP1 which has the longest side between MP2 and MP3, it is possible to improve the detection rate in detecting the landmark aligned in a reference line as will be discussed as follows. For example, we will consider the case that the image of the land mark is taken by a wide angle camera and has a deformation. FIG. 2A shows that the position of the mark primitive MP1 which has the longest side among all of the three mark primitives is placed at the end of the reference line. For this alignment, when we detect the mark primitive MP2 to identify the straight line L, the deviation of the position of the mark primitive MP2 from the straight line L, which is denoted as Z, becomes larger than the other case shown in FIG. 2B. FIG. 2B shows the mark primitive MP1 is placed between MP2 and MP3, the detection of the land mark position to specify the straight line L has a deviation Z of the either mark primitive from the straight line L is less than the deviation for the case shown in FIG. 2A so that it is possible to reduce the detection missing such that the line is not specified as a line. In addition, the longer the side length of the mark primitive MP1, the higher the rate to determine the land mark a straight line, because the side can be longer than the resolution limit of the camera. However, the shorter side length is desirable since the land mark labels can be small and easy to affix to the objects.

More detail positional relation among the mark primitives MP1, MP2 and MP3 is selected that the separation G1 between MP1 and MP2 measured at their left ends and the separation G2 between MP1 and MP3 measured at the right ends are substantially equal as shown in FIG. 1A as, $$G1 \approx G2. \quad (2)$$

Then the mark primitive MP1 always locates at the center of the land mark M. Therefore it is possible to reduce the detection missing when the land mark is detected as a straight line as shown in FIG. 2B. It is also possible to extend the length of the land mark M by stretching the lengths of the separations G1 and G2. By this variation of the extension, it is possible to distinguish the difference of the objects to which the land marks are affixed or to give directions to the autonomous robots and the moving vehicles.

For this purpose, the lengths of the sides of the second mark primitive MP2, the lengths to the third mark primitive MP3 and the lengths of the separations from the mark primitive MP2 (MP3) to the either end of the first mark primitive MP1 are predetermined. For example, the ratio as shown below can be used as;

$$L2:L3:G1(G2)=1:3:6 \quad (3)$$

By the knowledge of the predetermined ratio regarding the mark primitives MP, it is possible to specify the land mark and therefore the identification therefore detection and of the land mark in the image taken by the camera becomes easier. As far as keeping the ratio given by the equation (3), it implies the land mark. Therefore it is possible to specifically make plural kinds of the land marks by varying the lengths that are not used in the equation (3). By using such variation, it is possible to classify the objects to which the land marks are affixed. For the actual use, it is preferable to keep the relative lengths of the L1 more than 1.5 times, preferably 2 times, larger than that of L3.

The shape of the mark primitives is preferable to have a straight side in the direction of the reference line and a rectangular shape is desirable. The widths of the mark primitives MP are preferred to have reasonable widths which are larger than the detection limit determined by the resolution of the cameras that take the images of the landmarks. Therefore the land marks can be detected and specified for the kinds of the land marks. According to such detection limit, the widths of mark primitives are shorter than L3, for example shorter than and equal to a half of L1, preferably, one third of L1. By the relation of these physical dimensions, the straightness of the land mark is easy to be determined. The mark primitives MP are given by shapes of cut pieces which are made of a sheet material with thickness, colored in a predetermined color (such as black) and placed on a mother sheet of which back side has an adhesive for affixing. The predetermined color gives a contrast to detect the mark primitives.

As shown in FIG. 1B, each mark primitive can be given by a shape of a piece of sheet made of the recursive reflective material, which gives another contrast to distinguish the mark primitives MP. FIG. 1B shows the general type of the structure of the sheet fabricated with glass beads. This recursive reflective material is made from plural transparent micro (diameters of several tens of micron meters) globes (glass beads) B, a light reflective layer R that covers the lower hemispheres of the transparent micro globes, a transparent protection layer C that covers the upper hemispheres of the transparent micro globes and a substrate S to support these layers. The incident lights to the recursive reflective material are diffracted at the surface of the transparent micro globe and travels to the reflection layer R in the transparent micro globe. Then the lights are reflected at the reflective layer R and travels back to the surface of the transparent micro globe. The lights are further diffracted at the surface of the transparent micro globe B and retro-travels to the incident light direction. Other than the micro globes, micro prisms can be alternatively used for the recursive reflection material.

By using the recursive reflective material to form the shape of the mark primitives MP and lights to illuminate the mark primitives MP, it is easy to find and identify the land mark in the view of camera image.

As has been explaining, the land mark M simply consists of three mark primitives MP and is easy to be detected due to the simplicity of the pattern so that the low resolution camera and the video image picture taken in a low color contrast such as black and white image are allowed for use.

(Land Mark Detector)

Figure 3:
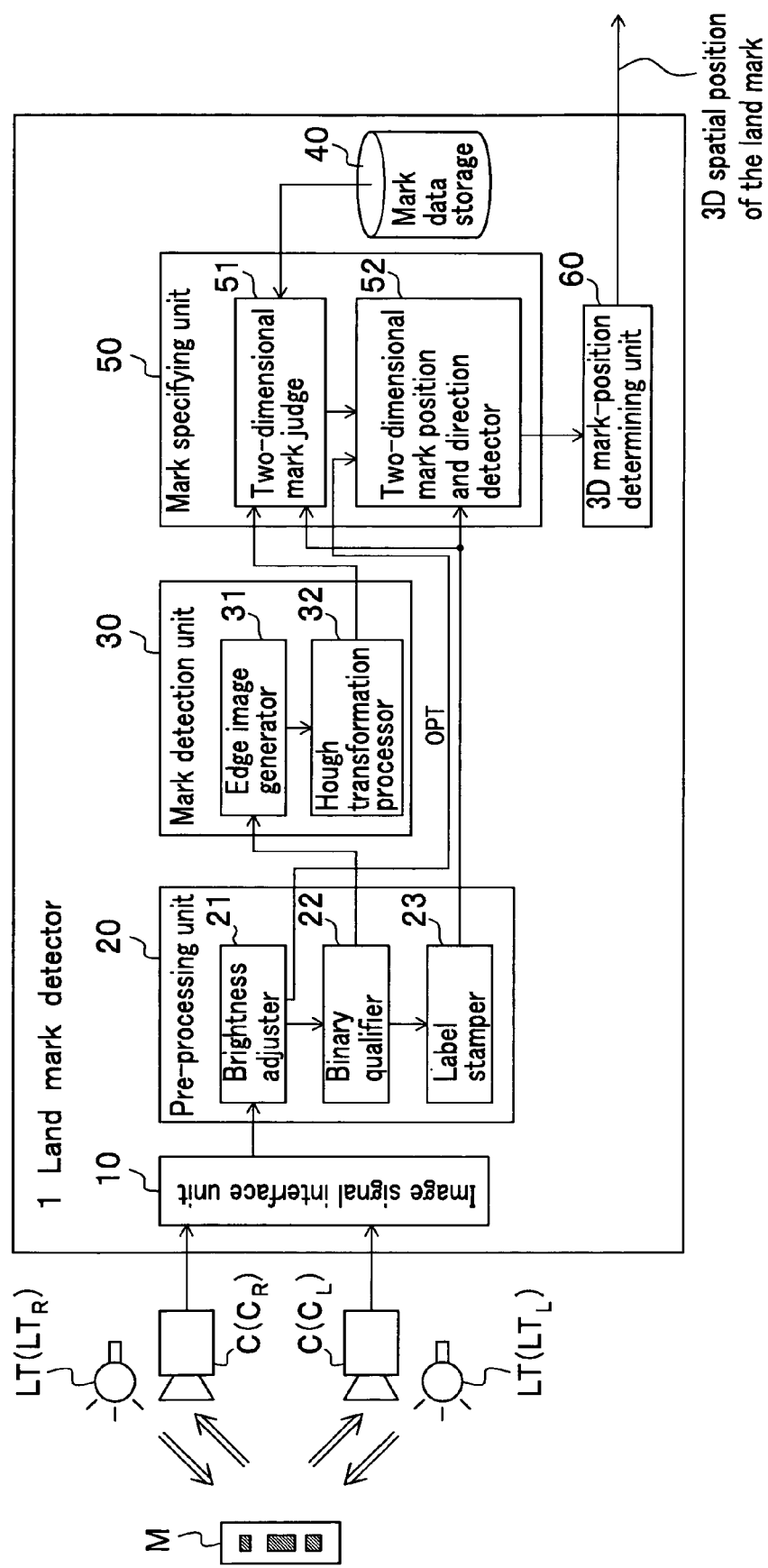
FIG. 3 is a schematic that shows a block diagram of the land mark detector.

FIG. 3 is a block diagram of the land mark detector. The land mark detector 1 is to determine the position of the presence of the land mark by using the image in a scene taken by an image acquisition means (called a camera, hereinafter) C. The land mark detector 1 comprises an image signal interface unit 10, a pre-processing unit 20, a mark detection unit 30, a mark data storage 40, a mark specifying unit 50 and a 3D mark-position determining unit 60.

In this embodiment, the land mark to be discussed is made of the recursive reflective material as shown in FIG. 1B. The camera C is an infrared camera which detects the light reflected on the land mark M affixed to the objects which are illuminated by the illumination means (called a light, hereinafter) LT.

The image signal interface unit 10 generates an in-frame image from the scanned image taken by two cameras (such as a right camera CR and a left camera CL). When the cameras take moving images, two series of in-frame images are generated for the right camera CR and the left camera CL. The in-frame images for right camera CR and the left camera CL (called the right camera images and the left camera images) are synchronously generated in the image signal interface unit 10. The right camera images and the left camera images are finally sent to the pre-processing unit 20. The functional blocks as a pre-processing unit 20, a mark detection unit 30 and a mark specifying unit 50 independently carry out the processes for the right camera images and the left camera images. Since these processes are same each other, and they will not be separately discussed but commonly in a process.

The pre-processing unit 20 is to fundamentally extract the possible candidates of the mark primitives MP so that the subsequent units and functional modules would determine is whether the possible candidates compose the land mark in there process. The pre-processing unit 20 consists of functional modules as an adaptive gain control (not shown in FIG. 3), a brightness adjuster 21, a binary quantifier 22 and a label stamper 23. The label stamper 23 is for the preprocessing necessary for the land mark detection.

The brightness adjuster 21 is to adjust the brightness of in-frame images to keep uniformity of the brightness over the frame of the image. This is necessary because the light LT illumination is weaker along the peripheral region and the image taken in the frame image is darker in the marginal area of the frame. For the appropriate binary quantization of the brightness of the image even in the marginal area of the frame to be done in the binary quantifier 22, the adjustment of the brightness of the in-frame image is carried out in the brightness adjuster 21. The adjustment is done by a simple moving average. The concrete process is that the brightness of each pixel that composes a frame of image is relatively given by the average of the partial frame that includes the area around each pixel. The partial frame should be larger than the width of the mark primitives MP and has typically 41 pixels in the horizontal dimension and 21 pixels in the vertical dimension. The relative brightness of each pixel is given by the division by the average brightness of the partial frame specified for each pixel. For example, the brightness of the pixel at the coordinates (u,v) is given by $I_{u,v}$ and the partial frame around the pixel has the range of (2n+1) in the horizontal direction and (2m+1) in the vertical direction. Then the adjusted brightness of the pixel at (u,v) as denoted by $O_{u,v}$ is given by the equation (4).

$$O_{u,v} = (2n+1)(2m+1)\frac{I_{u,v}}{\sum_{i=-n}^{n}\sum_{j=-m}^{m} I_{u+i,v+j}} \quad (4)$$

Figure 4:
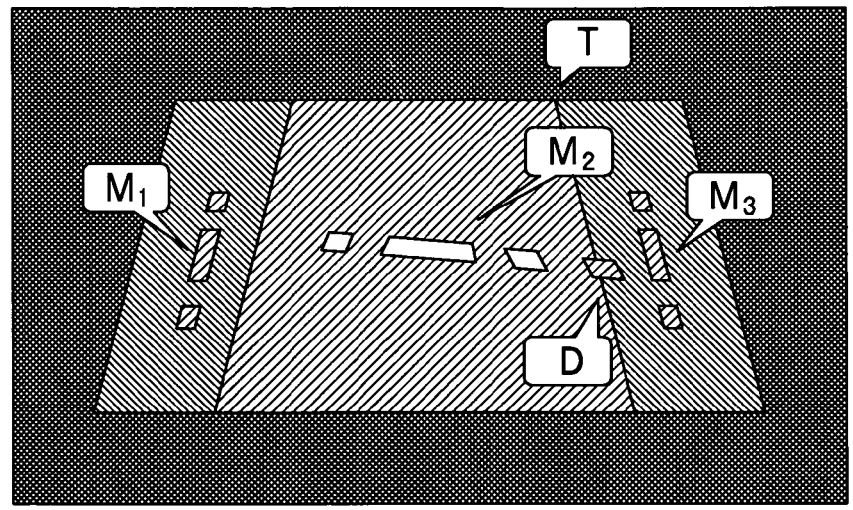
FIG. 4 is a picture of an image of a table to which the land mark regarding the present invention is affixed.
Figure 5:
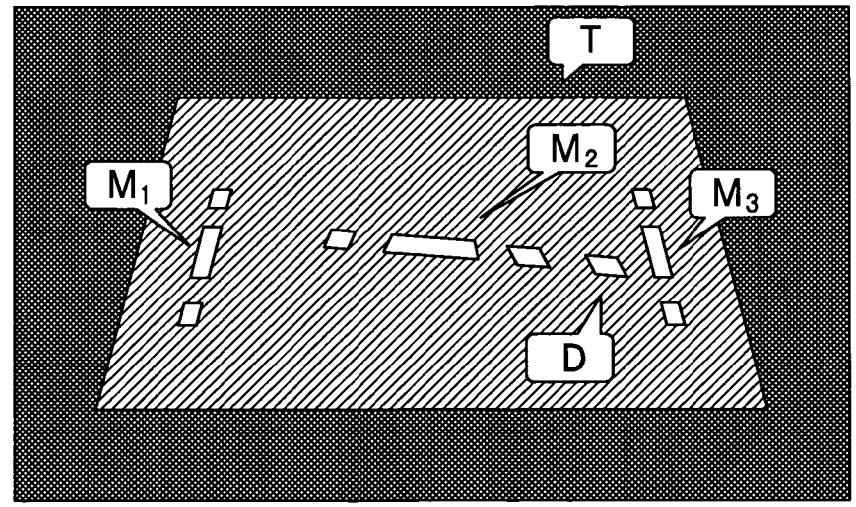
FIG. 5 is a brightness adjusted image picture generated from the picture of an image

FIG. 4 and FIG. 5 show the effect of this brightness adjustment and FIG. 4 shows the camera image of a table on which the land mark is affixed. The image is taken by the upper slant position to the top of the table and has the raw data of the brightness. FIG. 5 shows the brightness adjusted image by using the equation (4).

FIG. 4 shows a raw image of a table T on which three land marks (M1, M2, M3) and an irrelevant mark D which has the same reflectivity as the land marks are affixed. The whole of the table has non-uniform brightness such that the more marginal of the frame the darker of the image. In other words, the table T is less bright in the marginal area than in the center area. Therefore the brightness of the land mark M1 and M3 which locate in the marginal region in the frame is darker than the land mark M2 which locates in the central region of the frame. When we apply the binary quantification, only the land mark M2 is extracted or a part of table T other than three land marks M1 to M3 are extracted if the threshold of the brightness is given improperly.

The brightness adjuster 21 (as shown in FIG. 3) adjusts the brightness of the image as shown by FIG. 4. The adjustment result is shown in FIG. 5. The brightness of the land marks M1 and M3 which are in the marginal area of the table T increases the brightness and similar brightness to that of the land mark. It is possible that the brightness of the land marks can be adjusted and the brightness of the land marks can be unified.

At the binary quantifier 22, the brightness adjusted image generated at the brightness adjuster 21 is quantified into binary category for every pixel in the reference of the predetermined threshold. For example, the pixels that have brighter than the threshold are set to be "1" and the other pixels "0". Since the brightness adjusted image has rather uniform brightness over the frame of the image, the appropriate threshold can be determined beforehand.

The binary quantified image generated by the binary quantifier 22 shows, for example, the mark primitives MP of the land mark (M1, M2, M3) and the irrelevant mark D in the image. However, there is a potential risk that a region which has the same or more brightness against the brightness of the mark primitives is extracted. Therefore, such region (called as a spurious region) is a potential candidate for the mark primitives. The binary quantified image is used in the label stamper 23, the mark detection unit 30 and the edge image generator 31.

The label stamper 23 is to segregate each region specified by the binary quantified image from each other. Each segregated region is treated as a unique individual region to which a label is stamped, which we call individualization of the region. The labeled image generated by the label stamper 23 is referred at a two-dimensional mark judge 51 and the subsequent functional modules.

FIG. 7 shows the rules for the labeling for such individualization of the regions, where the position of the starting pixel in a region to be a potential candidate for the mark primitive. The coordinate of the position of the starting pixel is assigned as (0, 0). The other assignment for the neighboring pixels is that the upper left is as (−1, −1), the straight upper (0, −1), the upper right (1, −1) and the left (−1, 0). The rules (rule (1) to (5)) to determine the pixel value for each specific pixel are explained in FIG. 7.

The label stamper 23 (as shown in FIG. 3) carries out the labeling process which is sequentially scanned from the upper left neighboring pixel of the binary quantified image and determines the label of a particular pixel. The binary quantified image picture generated by the binary quantifier 22 (shown in FIG. 3) is classified to "1" for a candidate region for the mark primitive and "0" otherwise. The unique "ID" number is assigned for each region decided by the rules described below. The following rules assume the case that the specific pixel has the pixel value "1".

Rule 1:

When the pixel values for the neighboring pixels of which positions are (−1, −1), (0, −1), (1, −1) and (−1, 0) are all "0", then a unique ID number from "100" is assigned for the central pixel (0, 0) which is used for specifying these neighboring pixels.

Rule 2:

When an ID number has already been assigned for any neighboring pixel of those of which positions are (−1, −1), (0, −1) and (1, −1) and when the pixel of which position is (−1, 0) is "0", then the same ID number already used for the neighboring pixel is assigned for the central pixel (0, 0) which is used for specifying these neighboring pixels.

Rule 3:

When the pixel value for the neighboring pixels of which positions are (−1, −1), (0, −1) and (1, −1) are all "0" and when an ID number is assigned for the left neighboring pixel of which position is (−1, 0), then the same ID number already used for the left neighboring pixel is assigned for the central pixel (0, 0) which is used for specifying these neighboring pixels.

Rule 4:

When an ID number has already been assigned for any neighboring pixel of those of which positions are (−1, −1), (0, −1) and (1, −1) and when the ID number is same as that assigned for the left neighboring pixel of which position is (−1, 0), then the ID number already used for the left neighboring pixel is assigned for the central pixel (0, 0) which is used for specifying these neighboring pixels.

Rule 5:

When the ID numbers already been assigned for the neighboring pixels of which positions are (1, −1) and (0, −1) are different, then the ID number already assigned for the left neighboring pixel of which position is (−1, 0) is assigned for the central pixel (0, 0) which is used for specifying these neighboring pixels, the ID number assigned for the pixel of which position is (−1, 0) is assigned for all pixels, which satisfy the condition that they have the same ID as that assigned for the pixel of which position is (−1, −1), selected from all pixels over the binary quantified image picture.

Figure 8:
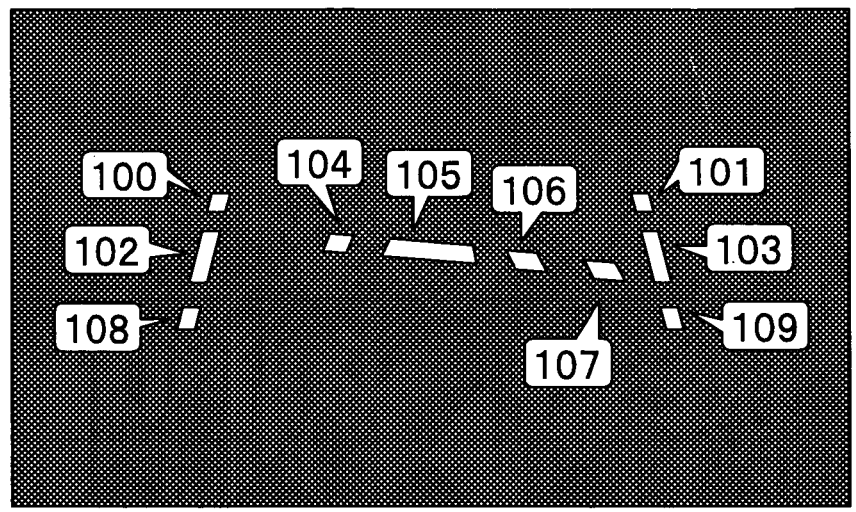
FIG. 8 shows a labeled image picture wherein every region is label-stamped.

Based on the above rules, the label which has a unique number (such as 100, 101 etc.) is set for each region as shown in FIG. 8 by labeling binary quantified image picture and the labeled image picture as shown in FIG. 8 can be obtained.

A mark detection unit 30 is to detect straight line segments of the objects of which images are taken by the cameras C. When the cameras C have taken the images of the land marks M, the pictures (that are the fixed views which cameras C take the scenes including the landmarks) includes the straight line segments that compose the contours of the mark primitives that compose the land marks. The mark detection unit 30 fundamentally includes the edge image generator 31 and Hough transformation processor 32.

Figure 6:
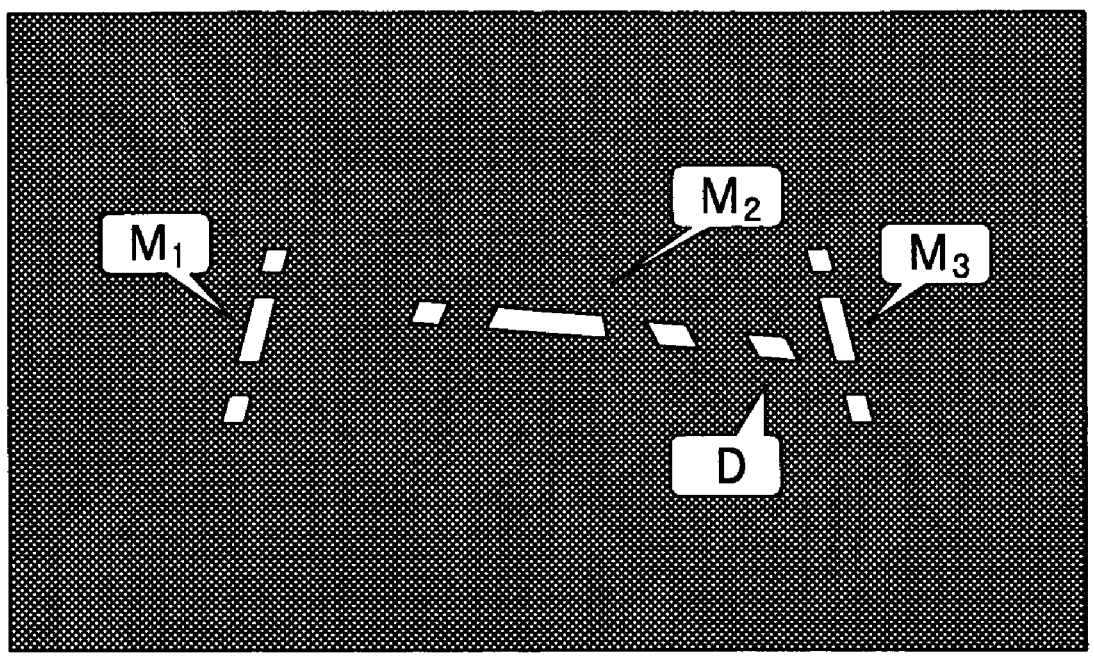
FIG. 6 shows a binary quantified image picture generated from brightness adjusted image picture.
Figure 9:
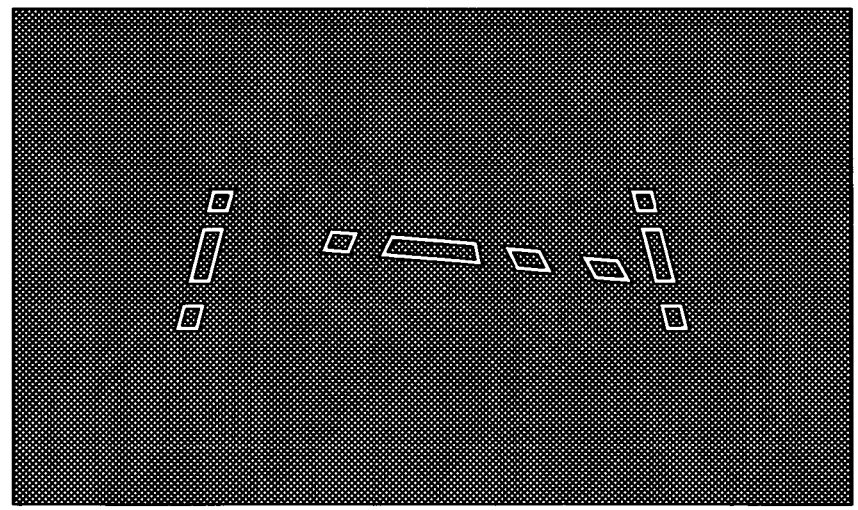
FIG. 9 shows an edge image picture wherein the edges are detected in the quantified image

The edge image generator 31 is to generate edge images from the picture taken by the cameras C. The edge image generator detects the transition of the pixel values defined in the binary quantified image picture generated by the binary quantifier 22 installed in the pre-processing unit 20 and generates an edge image picture. For example, the edge image generator detects the transition of pixel values given in the binary quantified image picture as shown in FIG. 6 and generates the edge image on the edge image picture as shown in FIG. 9.

The edge image picture can be generated from the picture (as shown in FIG. 4) taken by the image signal interface unit 10 and the brightness adjusted image picture (FIG. 5) generated by the brightness adjuster 21. But it is faster to generate the edge image picture from the binary quantified image picture than these pictures since the edge has already determined by the transition of the pixel values. Therefore, the process time can be saved by using the binary quantified image picture rather than using other pictures.

The Hough transformation processor (Hough transformation processing module) 32 can extract the straight line segments from the edge image pictures by Hough transforming the edge image generated by the edge image generator 31. Because the Hough transformation has a capability for robust extraction of the straight line segments from the images that have noise components. Therefore, the Hough transformation processor 32 can extract the straight line segments that compose the edges of the land marks M.

Figure 10:
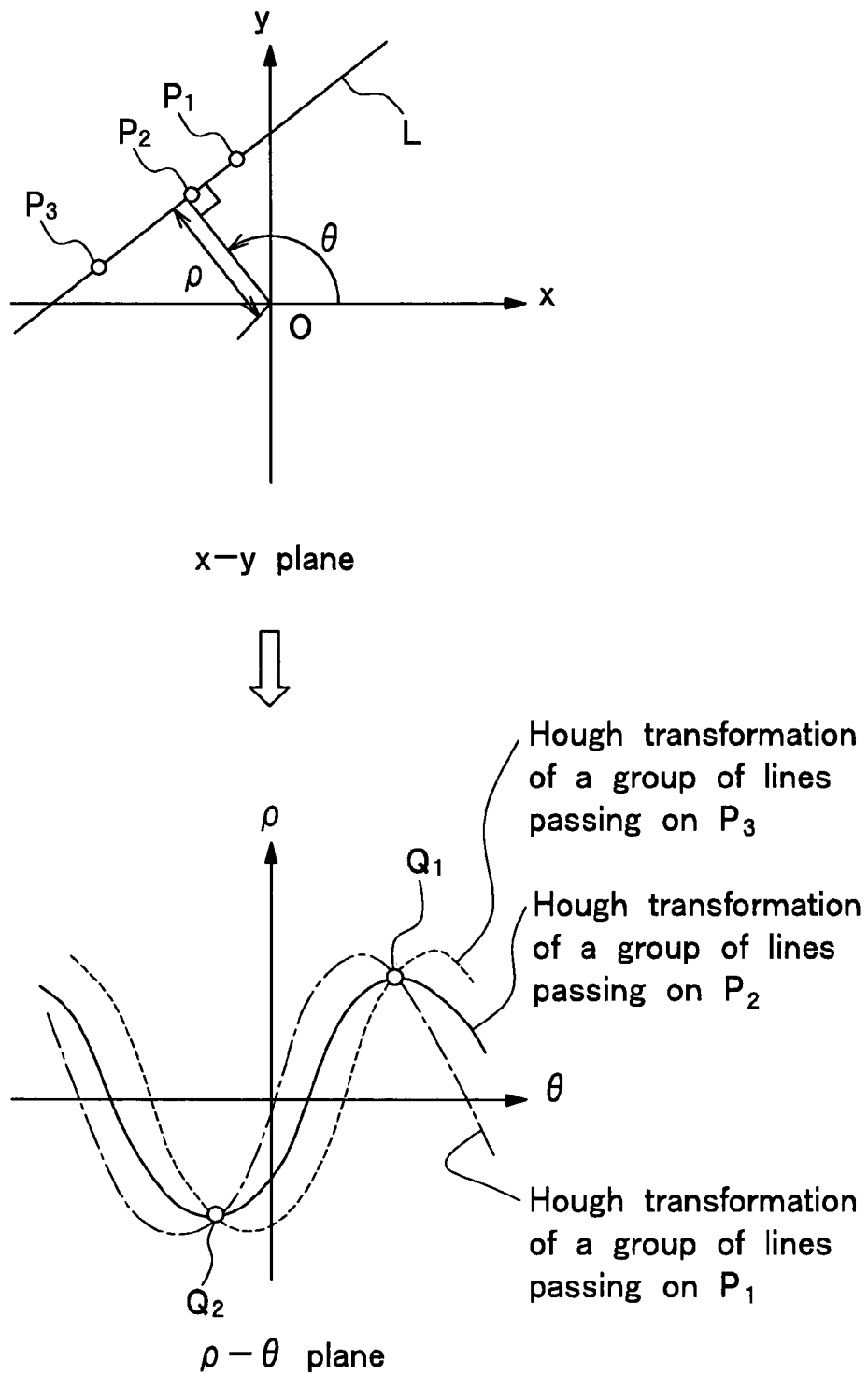
FIG. 10 is an explanatory schematic that shows the concept of Hough transformation.

FIG. 10A and FIG. 10B show the conceptual idea of Hough transformation. FIG. 10A is a x-y plane on which an objective line is placed. FIG. 10B is a plane where $\rho$ and $\theta$ are the variables transformed from x and y variable in a manner that a line L having cross points with x and y coordinates at (x, 0) and (0, y) can specify the vertical line from the origin thereto so that the vertical line is characterized by the length $\rho$ of the line segment of the vertical line and the angle $\theta$ against the x-axis in the x-y plane. Hough transformation is a linear mapping with a mode $2\pi$ in $\theta$ given by the following equation as;

$$\rho = x \cos \theta + y \sin \theta \qquad (5)$$

where, $\rho$ is the length of the line segment of the vertical line (called L) and $\theta$ the angle against the x-axis in the x-y plane. In the explanation of this mapping uses the assumption that the variables x and y are the cross points of the x-axis and the y-axis. However the vertical line which is characterized by $\rho$ and $\theta$ is uniquely (in a one-to-one correspondence) defined on the x-y plane against the line L and therefore all (x, y) points on the line L are converted into a single parameter point $(\rho, \theta)$ in the $\rho$-$\theta$ plane. Next we consider another property of Hough transformation in terms of the transformation of a group of lines in a certain points in the x-y plane. The group of lines that cross on the point $P_1$ which included in the line L is given as a sinusoidal curve in the $\rho$-$\theta$ plane as shown in FIG. 10B. Other points as $P_2$ and $P_3$ are given by two different sinusoidal curves. Since the point P1, P2 and P3 are on the same line L in x-y plane, these three sinusoidal curves coincide in a single parameter point Q1 which specifies the line L in the $\rho$-$\theta$ plane. In other words, these three sinusoidal curves cross at the single parameter point Q1. There is another cross point Q2 which is defined by the negative $\rho$ and $\theta$ parameters. But we take only positive branch in Hough transformation.

The Hough transformation processor 32 treats a line in the x-y plane in the $\rho$-$\theta$ plane as a two-dimensional discrete array. The Hough transformation processor 32 computes the parameter points $(\rho, \theta)$ for all edges on the edge image picture generated by the edge image generator 31 and takes a statistic computation to obtain the frequencies of the parameter point (ρ, θ) in the array. If the frequencies which are more than a predetermined value, they are determined as straight lines that characterize the edges of the mark primitives MP.

Figure 11:
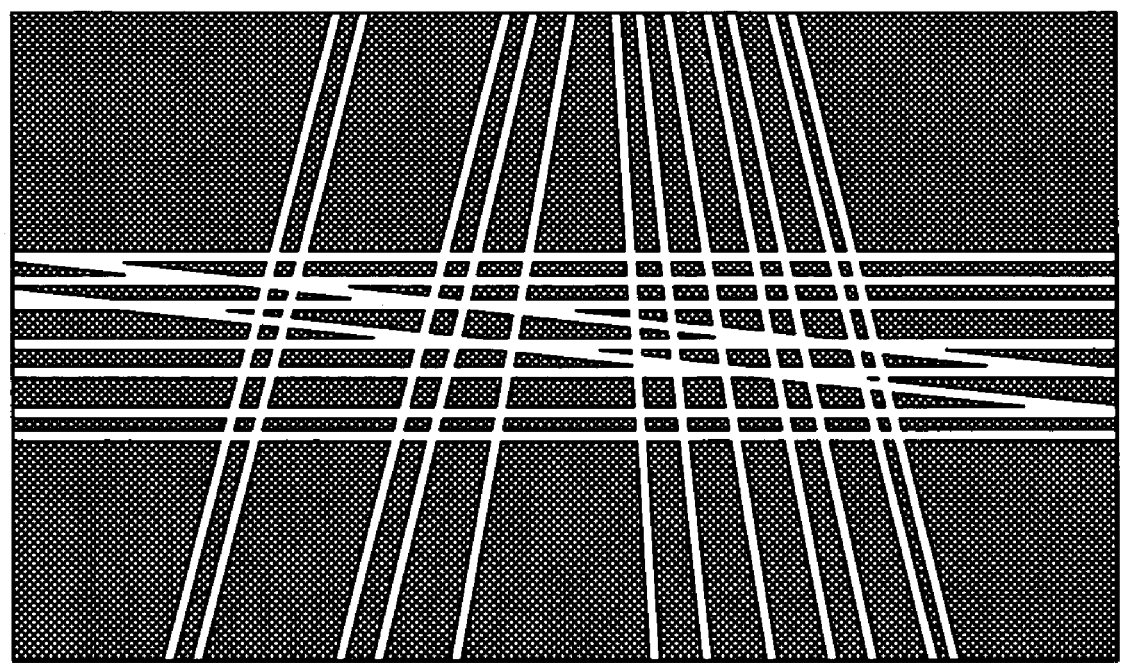
FIG. 11 shows a line picture wherein the lines are Hough-transformed from the edge image picture.

In this process, a group of straight lines as shown in FIG. 11 are obtained from the edge image picture as shown in FIG. 9. FIG. 11 shows the straight lines for the purpose of easy visualization but the Hough transformation processor 32 handles the parameter points (ρ, θ) and sends them to the mark specifying unit 50.

The mark data storage 40, implemented by a hard disk device, has the data of pattern data of the elemental mark dimensions and the relative ratios of the each kind of the mark primitives. The elemental mark dimensions and the relative dimensional ratios are given by equations (1) to (3) and given beforehand. The mark specifying unit 50 uses these data.

More specifically, the mark specifying unit 50 specifies the position of the mark primitives on the basis of the elemental mark dimensions and the relative dimensional ratios stored in the mark data storage 40 and the frequency that the candidate areas determined by the pre-processing unit 20 can be marginal to the lines determined by the mark detection unit 30. The mark specifying unit 50 comprises functional modules as a two-dimensional mark judge 51 and a two-dimensional mark position and direction detector 52.

The two-dimensional mark judge 51, the labeled images specified by means of the label stamper 23 is searched in the labeled image picture for label and the corresponding lines which are given by the mark detection unit 30 are evaluated in the view of the compliance to the elemental mark dimensions and the relative dimensional ratios stored in the mark data storage 40. The combination of the mark primitives which show the above compliances is judged as a land mark M. The labeled image judged as a land mark M is send to have been the two-dimensional mark position and direction detector 52 with the detail data on the labeled image picture.

Figure 12:
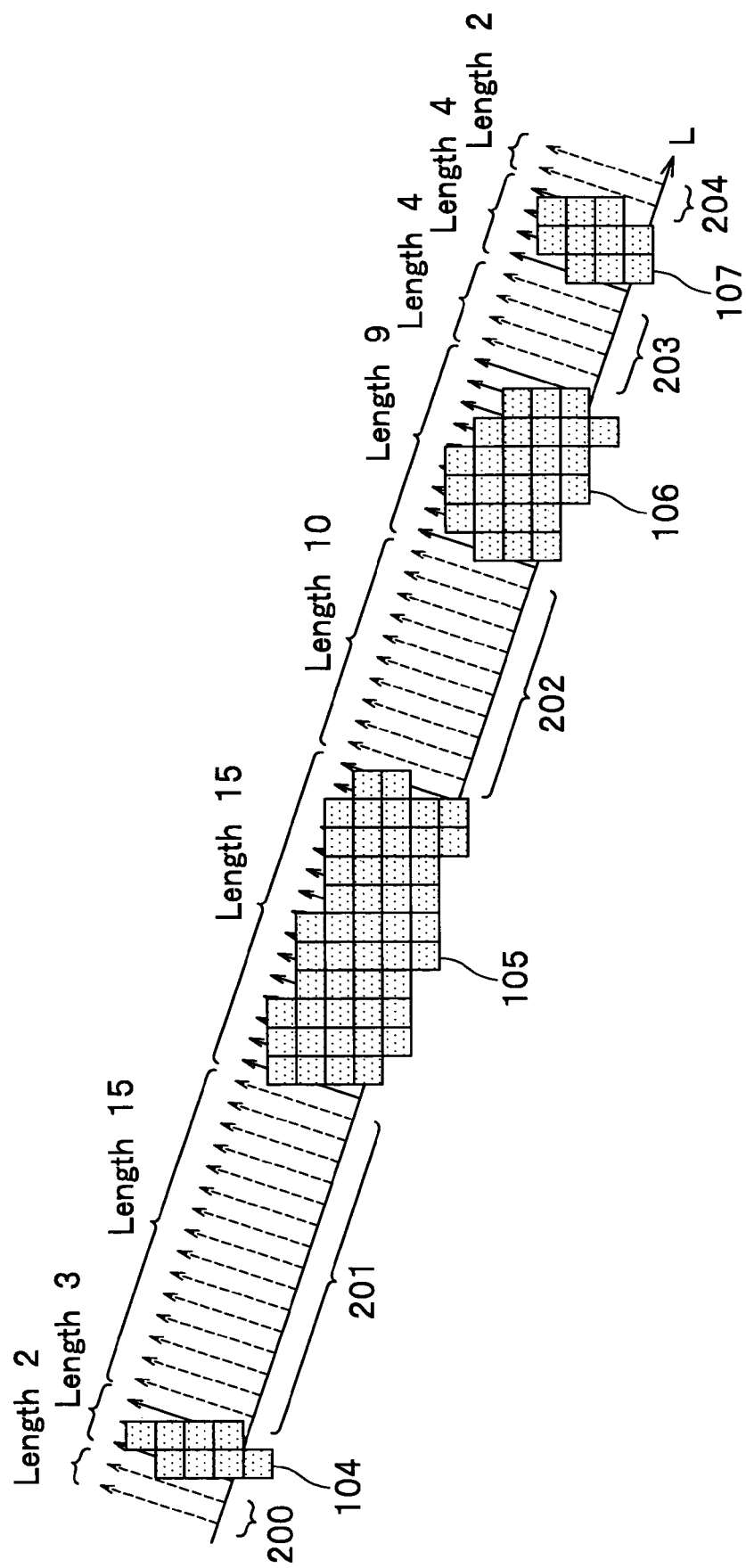
FIG. 12 is an explanatory schematic that shows the method to determine the lengths of the candidate regions and the lengths of blanks between the candidate regions.

The detail process to judge the land mark M in the mark specifying unit 50 is explained by using FIG. 12, FIG. 13 and sometime FIG. 3.

FIG. 12 shows an overlay of the straight line L which is obtained by the Hough transformation processor 32 on the labeled image picture where the labeled images (104 to 107) are shown. The two-dimensional mark judge 51 is to check the existence of the labeled pixels along the direction (which is called the secondary scanning direction) vertical to the line L (which directs to the primary scanning direction). The two-dimensional mark judge 51 counts the existence of the labeled pixels in the secondary scanning direction. In the scanning in the direction of the primary scanning direction, the lengths of the presence of the regions (104 to 107) of the labeled image (called "labeled region") and the other regions (blank regions 200 to 204) where no labeled images exist are measured by pixel counting. The regions (104 to 107) of the labeled image are presented in pixels in FIG. 12. The pixel counting is done along the secondary scanning direction with the interval which is narrower than the pixel with and, therefore this counting can compensate the error in Hough transformation and in selecting the secondary scanning direction. The two-dimensional mark judge 51 composes a list of the lengths regarding the labeled regions and the blank regions as shown in FIG. 13.

Finally, the two-dimensional mark judge 51 determines the alignment of the labeled regions that satisfy the relation given by the equations (1) and (2) under allowance of approximation as a land mark. The allowance for the approximation is necessary to accept handing of the images presented in a perspective due to camera views.

For the example shown in FIG. 12, a relation such as; (the length of the labeled region 104)<(the length of the labeled region 106)<(the length of the labeled region 105) is obtained. This relation satisfies the equation (1). The summation of the lengths of the labeled region (104) and the blank region (201) which is 18 counts as 3 counts plus 15 counts and another summation of the lengths of the blank region (202) and the labeled region (106) which is 19 counts as 10 counts and 9 counts are substantially same and therefore the relation given by the equation (2) is satisfied. According to this evaluation, it is determined that the labeled regions 104 to 106 are the mark primitives to compose a land mark. The region 107 does not satisfy the relation given by the equation (2) and therefore it is not determined as a mark primitive. For further rigorous determination, the relation given by the equation (3) is added to be associated with.

The two-dimensional mark position and direction detector 52 determines the position of the land mark and the direction of the land mark M which is determined by the direction of the land mark M on the picture taken by the two-dimensional mark judge 51. An example of determining the orientation of the land mark is as follows. When the mark primitives MP2 and MP3 (see FIG. 1A) are determined, the central position of the two ends of the mark primitives MP2 and MP3 is assumed to be the center position of the land mark M. The central position of MP1 is determined and two distances on the blank region from the MP2 and MP3 are compared and the direction which has longer distance from the mark primitive MP1 is specified as a positive orientation.

FIG. 14 shows the method to determine the center of mark primitive presented in the binary quantified image picture by the two-dimensional mark position and direction detector 52.

Figure 14A:
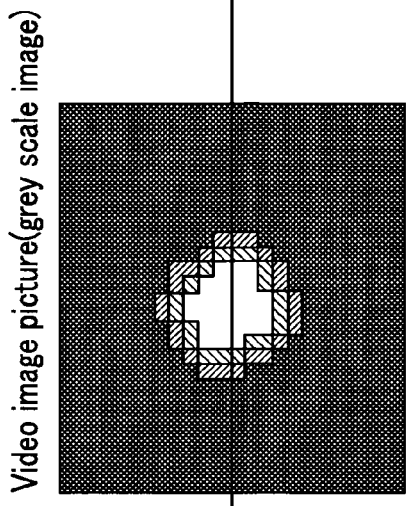
FIG. 14A is an explanatory schematic that shows a method to determine the barycenters of the mark primitives.
Figure 14A:
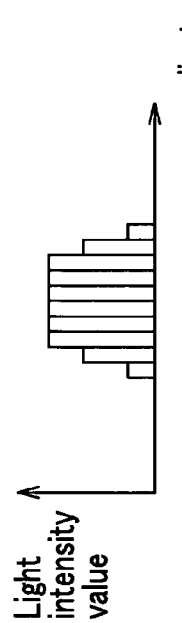

A typical method to determine the barycenters of the mark primitives is carried by using the binary quantified image pictures generated by the binary quantifier 22 (FIG. 14A). The edges of the regions are determined by the threshold value for the binary quantification. Therefore the resolution of the edges to specify the regions is limited by the pixel size since the quantification of the light intensity is determined in a binary manner.

Figure 14B:
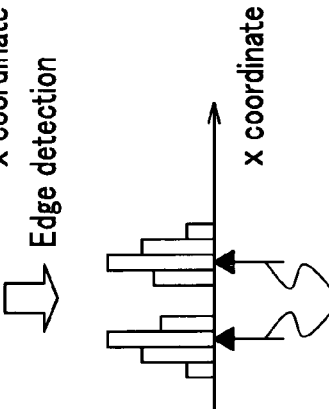
FIG. 14B is an explanatory schematic that shows a method to select the regions of the mark primitives.
Figure 14B:
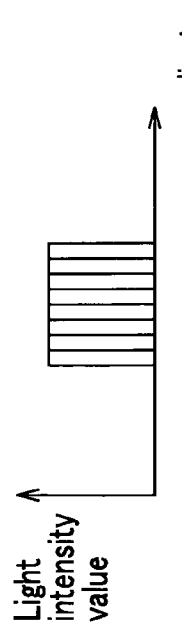
Figure 14B:
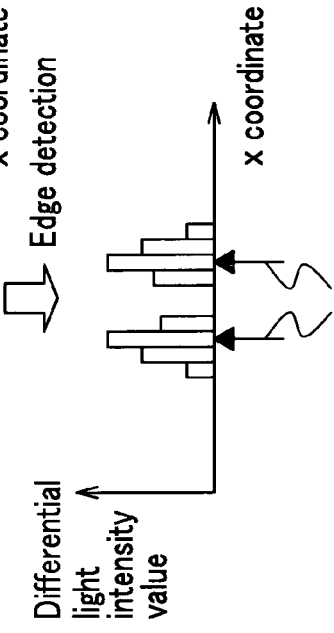

In order to determine the position of the edge more likely to the actual boundaries of the regions of the mark primitives, the land mark detector 1 has an optional process where grey scaled pictures originated from the video image pictures are used. The brightness adjusted image picture is sent to the two-dimensional mark position and direction detector 52 (as shown in the line denoted by "OPT" in FIG. 3) and compared with the regions of the mark primitives judged by the two-dimensional mark judge 51 to select the regions of the mark primitives in the brightness adjusted image picture as shown in FIG. 14B. This comparison and selection are carried out to eliminate the spurious mark primitives in the brightness adjusted image picture. Since the brightness adjusted image picture is given in a grey scale, the gradation of the light intensity of each pixel can be served for the determination of the most likely edges for the boundaries of the mark primitives. For such purpose, the differentiation of the light intensity of the pixels that compose the selected mark primitives in the brightness adjusted image pictures is taken and the differential light intensity values by differentiating the light intensity are obtained against the pixels that compose the selected mark primitives. The peaks in the differential light intensity are the most likely boundaries of the mark primitives. The peak positions (those in, for example, the x coordinate) are determined by the quadratic fitting by which the maximum value point of the fitted quadratic equation over with the adjacent largest three values of the differential light intensity represents the peak position. This computation as shown in FIG. 14B is performed by the two-dimensional mark position and direction detector 52. As the result, the peak positions obtained by this computation have finer resolution than the resolution given by the pixel size. By using these positions of the edges determined by this process, the more likely centers of the mark primitives can be obtained. Such mark primitives can be optionally used in the 3D mark-position determining unit 60.

The 3D mark-position determining unit 60 is to determine the 3D spatial position at which the land mark locates based on the positions of the mark primitives specified by the two-dimensional mark position and direction detector 52. The information regarding 3D spatial position of the land mark is output with the information of the information of the orientation of the land mark specified by the two-dimensional mark position and direction detector 52.

The 3D spatial position of the land mark is specifically determined for the 3D spatial positions of the centers of two mark primates which locate both ends of the land mark.

Figure 15:
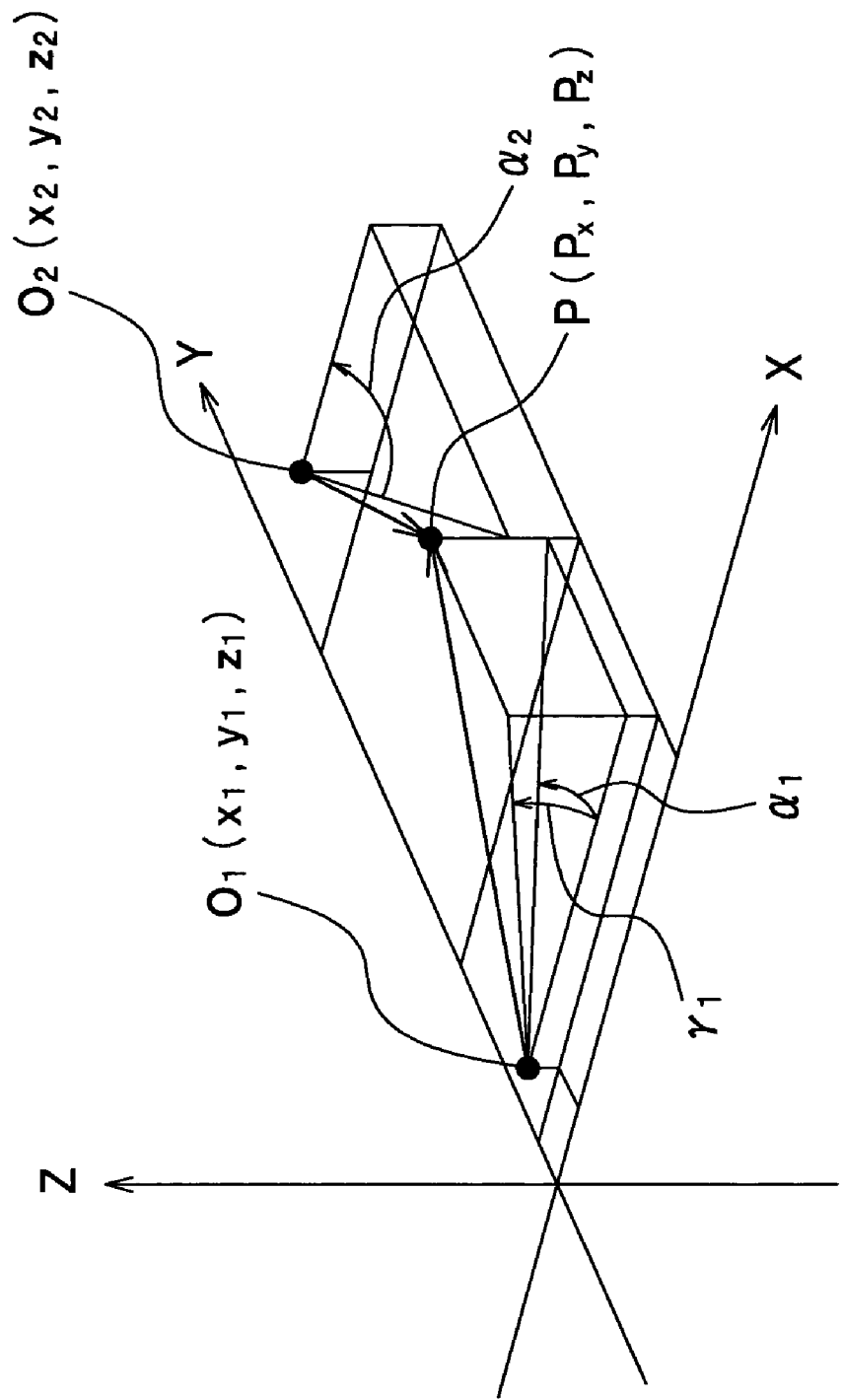
FIG. 15 is an explanatory schematic that shows the method to determine the 3D spatial position of the land mark.

FIG. 15 shows the coordinative relation to determine the 3D spatial positions where the fundamental spatial data are given by the cameras C. The computation for the spatial position determination is done by using the parallax provided by the two cameras. The 3D mark-position determining unit 60 where the positions of the land marks given by the two-dimensional mark position and direction detector 52 are first calibrated to eliminate the distortion due to the camera lens for every pixel in the 2D by using the calibration data stored in the mark data storage.

The focal centers of the two cameras CR and CL are noted as $O1(x1, y1, z1)$ and $O2(x2, y2, z2)$. The angles of the incident lights from the center of the mark primitive are assumed that the horizontal angles as $\alpha 1$ and $\alpha 2$ and the vertical angles $\gamma 1$ and $\gamma 2$ for the cameras CR and CL, respectively. However the angle $\gamma 2$ is not used and it is not presented in FIG. 15.

The 3D position P ($Px$, $Py$, $Pz$) of the center of the mark primitive can be obtained by computing the following equations (6) to (8).

$$Px = (x1 \tan \alpha 1 - y1 - x2 \tan \alpha 2)/(\tan \alpha 1 - \tan \alpha 2) \quad (6)$$

$$Py = (Px - x1) \tan \alpha 2 + y1 \quad (7)$$

$$Pz = (Px - x1) \tan \gamma 1 + z1 \quad (8)$$

As explained above, the 3D mark-position determining unit 60 can determine the 3D position of the center position of the mark primitive. Therefore it is possible to determine the length of the land mark in the 3D space by computing the relative distance between the positions of the centers of two mark primitives that compose the single land mark. By this length determination of the land mark, it is possible to particularly specify the particular objects. Reversely, it is possible to specify the location of the moving vehicles on which the land mark detection system regarding the present invention is installed if the lengths of all land marks are same.

The 3D positions obtained in the above equations are based on the position of cameras C. Therefore the 3D positions can be associated with the global navigation information to determine the geometrical positions.

In the above discussion, we have explained the construction and function of the landmark detector 1. However, the present invention is not confined in these concrete elements used in the above discussion. For example, only one camera C is used and the land mark detector 1 picture may function as a 2D position determination using such picture taken by the single camera C. For this case, we may remove the 3D mark-position determining unit 60.

The land mark is made from a recursive reflective material and the land mark which is shined by the light LT makes a remarkable contrast against the background due to the reflected light. The land mark detector 1 detects the land mark based on the picture which includes the image of the reflected light on the recursive reflective material. Preferably, a colored land mark is used for the present invention wherein the color is predetermined (for example red color) and the pre-processing unit specifically detects the regions which have the colored portion on the picture taken by color cameras C. For this purpose, color filters may be attached to the camera lenses or electrical filtering is done in the camera electrical processing or in the pre-processing unit 20.

The land mark detector 1 can be constructed by the conventional computer system which includes at least a CPU, memories and a storage device with a specific computer program to function as described above. This program called a land mark detection program can be down load to such conventional computer system through a communication network or by recording media such as CD-ROM if the conventional computer system includes communication interfaces or device interface subsystems.

[Operation of Land Mark Detector]

Figure 16:
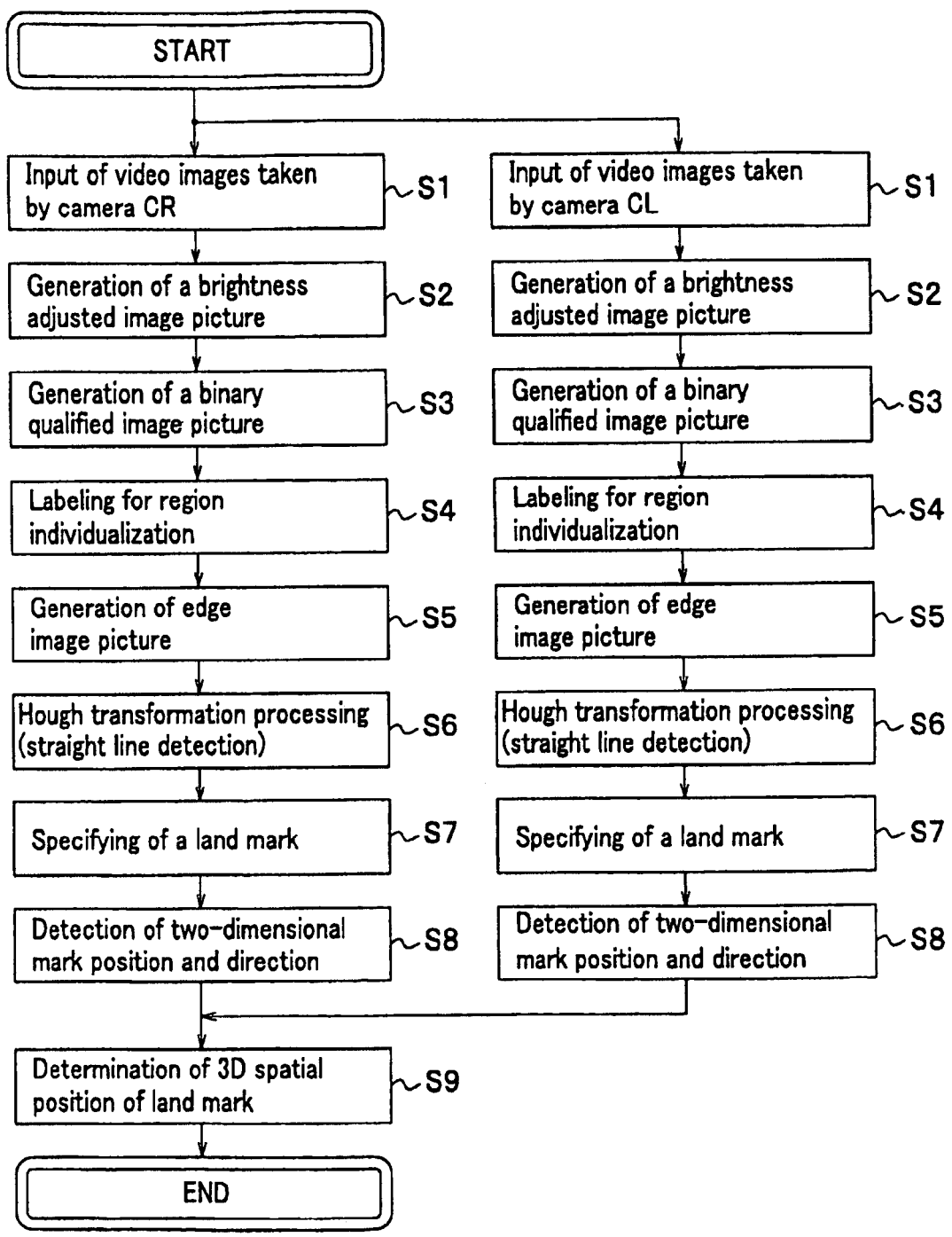
FIG. 16 is a flow chart that shows the operation of the land mark detector regarding the present invention.

FIG. 16 shows a flow chart of the land mark detector 1. The operation steps of the land mark detector 1 are explained by this flow chart. The steps S1 to S8 are independently assigned for the right camera CR and the left camera CL. Since these operation steps are identically same, the explanation is carried out just a single flow of the operation steps.

(In-frame Image Input Step)

First, the land mark detector 1 inputs an in-frame image from the scanned image taken by the two cameras CR and CL after generating the in-frame image by means of the image signal interface unit 10 (step S1). A near field infra-red light is used in the example of the in-frame image as shown in FIG. 4 in a presentation of the picture which shows an image of the reflected light on the land mark M. The picture shows the less brightness in the peripheral regions due to low illumination of the light.

(Region Extraction Step)

The land mark detector 1 adjusts the brightness of the image on the picture by using the brightness adjuster 21 over the whole picture area in the in-frame image and the uniformity of the brightness over the frame of the image is obtained. Therefore the brightness adjusted image picture (given by FIG. 5) that is generated (step S2) by the absolute brightness of the land mark can be compared over whole picture in a single standard to segregate the land mark from other images.

The land mark detector 1 generates the binary quantified image picture by using the binary quantifier 22 installed in the pre-processing unit 20 under the criterion of the predetermined threshold value (S3). By this step possible candidates of the mark primitives MP can be selected.

Further, the land mark detector 1 individualizes the regions (step S4) which are selected in the step 3 by labeling the regions by the binary quantified image picture is generated. The label stamper 23 generates the labeled images which have unique individual labels based on the pixel numbers. FIG. 8 shows the resultant labeled image picture generated by the label stamper 23.

(Edge Image Picture Generation Step)

The land mark detector 1 generates an edge image picture (the step S5) from the picture taken by the cameras C by means of the edge image generator 31 installed in the mark detection unit 30. More concretely, the edge image generator 31 detects the lines of edges at which the pixel values of the binary quantified image picture change and generates the edge image picture which is composed only with such lines of edges.

The land mark detector 1 detects straight lines (S6) on the edge image picture by Hough-transforming the edge image generated in the step S5 by means of Hough transformation processor 32. By this step, the straight line segments which compose the mark primitives of the land marks are detected by the parameters points ($\rho$, $\theta$) which Hough transformation processor 32 handles.

(Mark Specifying Step)

On the basis of the straight lines detected in the step S6, the land mark detector 1 specifies the land mark M (the step S7) by a combination of mark primitives which are approximately equal to the elemental mark dimensions and the relative dimensional ratios which are stored in the mark data storage 40 by means of the two-dimensional mark judge 51 installed in mark specifying unit 50, wherein the labels and the corresponding lines are searched in the labeled image pictures generated in the step S4.

The land mark detector 1 determines the position of the land mark and the direction of the land mark M on the picture of the land mark M which the two-dimensional mark position and direction detector 52 on the basis of the mark primitives determined by the two-dimensional mark judge 51 (Step S7). When the mark primitives MP2 and MP3 (see FIG. 1A) are determined, the central positions of the mark primitives MP2 and MP3 are assumed as the center position of the land mark M. The central position of MP1 is determined and two distances on the blank region from the MP2 and MP3 are compared and the direction which has longer distance from the mark primitive MP1 is specified as a positive orientation.

All of these steps are operated for each in-frame picture which is generated by the image signal interface unit 10 for the views obtained by the right and left cameras CR and CL. The center positions of the mark primitives MP2 and MP3 taken by the right-hand camera CR and the left-hand camera CL are sent to the 3D mark-position determining unit 60.

(Mark Position Determining Step)

The land mark detector computes the 3D spatial position of the landmark (step S9) on the basis of the central positions of the mark primitiveness MP2 and MP3 on the pictures.

(3D Land Mark Position Determining Step)

The 3D mark-position determining unit 60 provides the positions of the centers of two mark primitives positioning both sides of the land mark M.

Setting the separation length of the centers of the mark primitives as the land mark length, it is possible to identify the land mark by the difference of the land mark lengths. Therefore it is possible that the moving vehicles such as robots can change the task to the objects on which the land marks are affixed. In stead of specifying the two center positions of the mark primitives MP2 and MP3 as the position of the land mark, the middle point of the centers of the mark primitives may be the 3D position of the land mark M.

Since the land mark detector 1 can determine the position of the land mark, the moving vehicles or robots can specify the geometrical positions and the direction of the land mark even in the condition where the distance and direction from the land mark detector is varying.

EXAMPLES OF THE LAND MARK AND THE LAND MARK DETECTOR

Figure 17B:
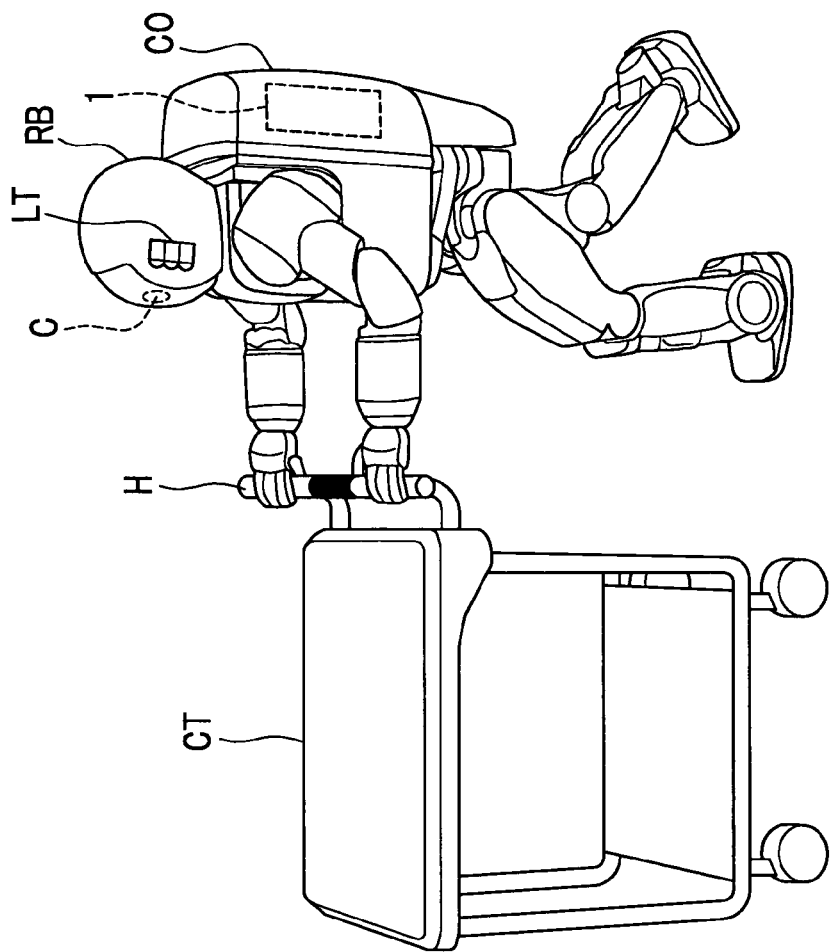
FIG. 17B is a schematic that shows a robot pushes a cart having a handle to which the land mark is affixed.
Figure 18A:
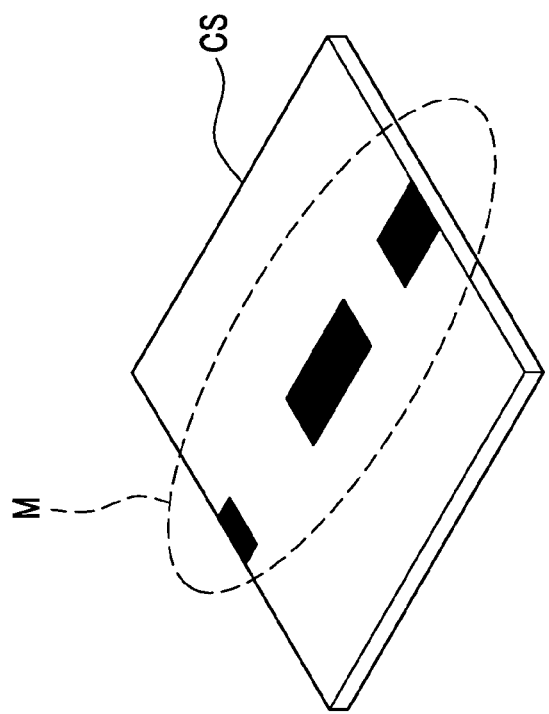
FIG. 18A is a schematic that shows a CD on which a land mark is affixed.
Figure 18B:
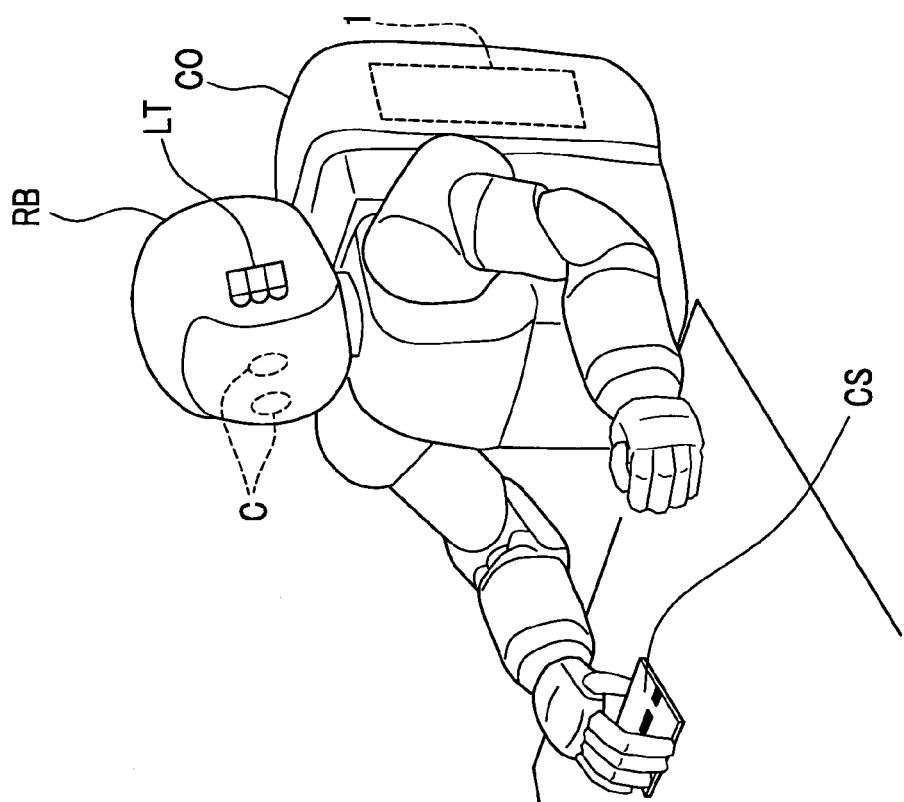
FIG. 18B is a schematic that shows a robot to grasps the CD to which the land mark is affixed.

FIG. 17B shows the first example that robot pushes a cart on the handle on which a land mark is affixed. FIG. 18B shows the second example such that a robot pickups and handles a CD (compact disc) on which the land mark is affixed.

First Example

Figure 17A:
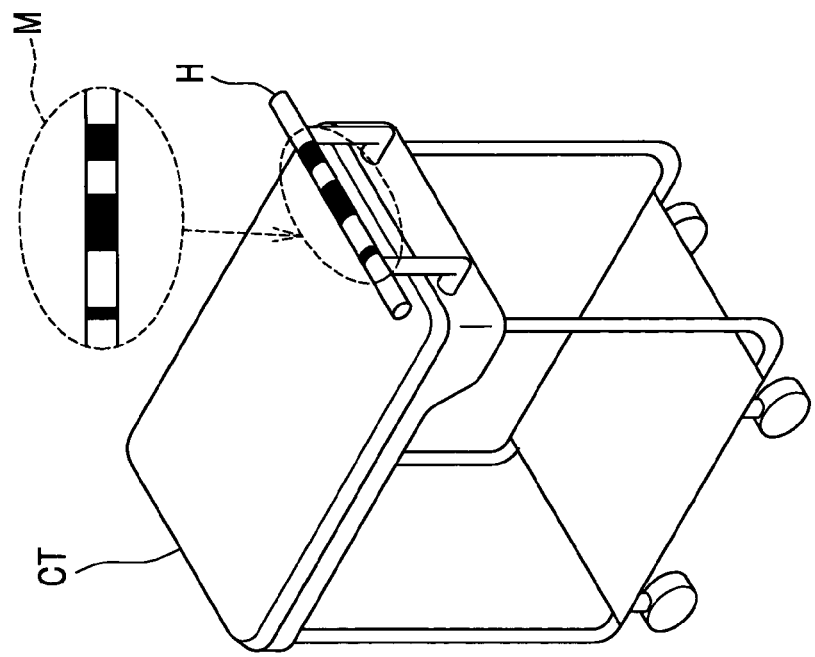
FIG. 17A is a schematic that shows a handle on which a land mark is affixed.

FIG. 17A shows a land mark made from the recursive reflective material is affixed on the surface of a handle of a cart CT. FIG. 17B shows the robot RB detects the position and the direction of the handle H, grasps the handle and pushes the cart CT.

As shown in FIG. 17A, the characteristics of the direction and the elemental mark position of the land mark are not lost and the detection of the land mark is possible. Since the land mark M has the direction information, the robot RB (in FIG. 17B) understands the necessity to push the cart CT from the right position in FIG. 17B.

The robot RB has the land mark detector 1 installed in the controller CO, two infra-red cameras C in the head and a near infra-red light LT. When the robot RB shines the cart CT by the near infra-red light LT, the land mark is detected by the infra-red camera C which takes the picture of scene in which the land mark included. The robot RB specifies the handle H on which the land mark is affixed, grasps the handle and pushes the cart CT.

Example 2

The robot RB detects the presence of the land mark in his view taken by the infra-red camera installed in the head. Since the land mark is affixed on the CD in a predetermined rule to specify the direction and orientation of the CD cases. Then, the robot RB can determine the position and the direction and orientation of the CD.

In the condition such that the distances to and the directions of the objects from the robot are varying, the land mark detector can determine the position and the direction of the land mark.

What is claimed is:

1. A land mark detecting apparatus simultaneously used with a land mark that comprises plural mark primitives which have rectangular shapes and are aligned in a reference line to which all said rectangular shapes have parallel sides,
    wherein a first mark primitive has longer sides parallel to said reference line than a second and a third mark primitives which are placed in both sides of said first mark primitive along said reference line, respectively,
    wherein the parallel sides of the plural mark primitives are the respective longer pairs of sides of respective said plural mark primitives,
    the land mark detecting apparatus comprising a set of cameras and a land mark detector which includes
    an image signal interface unit to receive image signals from said set of cameras and to generate a video image picture from said image signals,
    a pre-processing unit to determine candidate regions for said mark primitives in said video image picture wherein said candidate regions are remarked by any one of differences of the color and brightness of the image, a straight line detector to detect straight line segments of said candidate regions in said video image picture, a mark specifying unit to specify positions of said mark primitives in said land mark by extracting from said candidate regions for said mark primitives on a basis of information of elemental dimensions and relative dimensional ratios which are predetermined for said land mark and information of presence ratio of said region exiting on said straight line segments.

2. A pre-processing unit according to claim 1, wherein said straight line detector includes an edge image generator which generates an edge image picture from said video image picture and a Hough transformation processor which extracts straight lines from edge images in said edge image picture by Hough transforming said edge images.

3. A mark specifying unit according to claim 1 further including a three-dimensional land mark position determining unit that computes three-dimensional position of said land mark on a basis of said candidate regions for said mark primitives and dimensional land mark data stored in a mark data storage.

4. A mark specifying unit according to claim 3, wherein three-dimensional land mark position determining unit further uses edges of mark primitive of which edges are determined by differentiated light intensities of said video image pictures.

5. A land mark detecting method, by which a land mark comprising plural mark primitives which have rectangular shapes and are aligned in a reference line to which all of said rectangular shapes have parallel sides with different length respectively, wherein the parallel sides of the plural mark primitives are the respective longer pairs of sides of respective said plural mark primitives, is detected, the landmark detecting method comprising steps of;

receiving video images taken by plural cameras, pre-processing for determining candidate regions for said mark primitives in said video image picture wherein said candidate regions are remarked by any one of differences of color and brightness of image, generating an edge image picture by detecting edges of all of said candidate region, carrying out a Hough transformation process of said edge image picture by which straight lines are detected from edge images in said edge image picture, specifying positions of said land primitives in said land mark by extracting from said candidate regions for said mark primitives on a basis of information of elemental mark dimensions and relative dimensional ratios which are predetermined for said land mark and information of presence ratio of said region exiting on said straight line segments, and computing a three-dimensional land mark on a basis of said candidate regions for said mark primitives and dimensional land mark data stored in a mark data storage.

6. A computer-readable medium encoded with a program of land mark detection, by which a land mark comprising plural mark primitives which have rectangular shapes and are aligned in a reference line to which all of said rectangular shapes have parallel sides with different length respectively, wherein the parallel sides of the plural mark primitives are the respective longer pairs of sides of respective said plural mark primitives, is detected under cooperation with a computer system which comprises at least one computer hardware, the computer program enabling said computer system to execute steps of:

controlling receipt of video images taken by plural cameras, pre-processing for determining candidate regions for said mark primitives in said video image picture wherein said candidate regions are remarked by any one of differences of color of image and brightness of image, generating an edge image picture by detecting edges of all of said candidate region, carrying out a Hough transformation process of said edge image picture by which straight lines are detected from edge images in said edge image picture, specifying positions of said land primitives in said land mark by extracting from said candidate regions for said mark primitives on a basis of information of elemental mark dimensions and relative dimensional ratios which are predetermined for said land mark and information of presence ratio of said region exiting on said straight line segments, and computing a three-dimensional land mark on a basis of said candidate regions for said mark primitives and dimensional land mark data stored in a mark data storage.

* * * * *